US010860607B2

(12) United States Patent
Danilov et al.

(10) Patent No.: US 10,860,607 B2
(45) Date of Patent: Dec. 8, 2020

(54) SYNCHRONIZATION OF METADATA-BASED SYSTEM SNAPSHOTS WITH A STATE OF USER DATA

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 147 days.

(21) Appl. No.: 16/047,639

(22) Filed: Jul. 27, 2018

(65) Prior Publication Data

US 2020/0034471 A1    Jan. 30, 2020

(51) Int. Cl.
*G06F 16/27* (2019.01)
*G06F 12/02* (2006.01)
*G06F 16/22* (2019.01)

(52) U.S. Cl.
CPC .......... *G06F 16/27* (2019.01); *G06F 12/0261* (2013.01); *G06F 16/2246* (2019.01); *G06F 2212/1044* (2013.01)

(58) Field of Classification Search
CPC ............ G06F 16/9027; G06F 12/0253; G06F 16/2246; G06F 2212/7205
USPC ........................................................ 707/639
See application file for complete search history.

(56) References Cited

U.S. PATENT DOCUMENTS

| 9,176,871 | B1* | 11/2015 | Serlet ................. G06F 12/0269 |
| 10,616,101 | B1 | 4/2020 | Peterson et al. |
| 2004/0024826 | A1 | 2/2004 | Halahmi et al. |
| 2008/0071841 | A1 | 3/2008 | Okada et al. |
| 2013/0332660 | A1* | 12/2013 | Talagala .............. G06F 11/1441 711/103 |
| 2015/0067283 | A1 | 3/2015 | Basu et al. |
| 2016/0292178 | A1* | 10/2016 | Manville ............. G06F 16/1752 |
| 2018/0267985 | A1 | 9/2018 | Badey et al. |

OTHER PUBLICATIONS

Office Action dated Jul. 2, 2020 for U.S. Appl. No. 16/231,051, 27 pages.

* cited by examiner

*Primary Examiner* — Hung T Vy
(74) *Attorney, Agent, or Firm* — Amin, Turocy & Watson, LLP

(57) ABSTRACT

Synchronization of metadata-based system snapshots with a state of user data is presented herein. A snapshot component can generate, at respective times, snapshots of roots of respective trees of a system—the respective trees comprising metadata representing respective states of the system corresponding, via the snapshots, to the respective times. Further, a garbage collection component can select a snapshot of the snapshots of the roots that is older than remaining snapshots of the snapshots of the roots, and determine, using an object table of the snapshot referencing data chunks comprising respective objects of the system, whether a data chunk of the data chunks comprises an inactive object of the respective objects to facilitate a selection of the data chunk as a garbage collection (GC) candidate for deletion via a GC procedure.

20 Claims, 15 Drawing Sheets

1300 —

1310 — EXCLUDE, BY THE SYSTEM, THE DATA CHUNK FROM BEING DELETED DURING THE GC PROCESS

1320 — IN RESPONSE TO A SEQUENCE NUMBER THAT WAS ASSIGNED TO THE DATA CHUNK UPON CREATION OF THE DATA CHUNK BEING DETERMINED TO BE LESS THAN OR EQUAL TO A GC FRONT VALUE CORRESPONDING TO THE SYSTEM SNAPSHOT, DELETE, BY THE SYSTEM DURING THE GC PROCESS, THE DATA CHUNK

SYNCHRONIZATION OF METADATA-BASED SYSTEM SNAPSHOTS WITH A STATE OF USER DATA

TECHNICAL FIELD

The subject disclosure generally relates to embodiments for synchronization of metadata-based system snapshots with a state of user data.

BACKGROUND

Conventional storage technologies that use metadata-based search trees for storage operations are susceptible to data loss when roots of corresponding search trees are lost or corrupted. Further, recovery from erroneous deletion of data is difficult to perform as such recovery is a manual procedure, and data to be recovered can be referenced from different search trees and stored across different storage blocks.

Although conventional storage technologies have tried to mitigate data loss by storing obsolete roots of metadata-based trees for week(s), disparate trees that have been updated independently may not be able to consistently represent a state of a system at a particular age of the system. Consequently, conventional storage technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
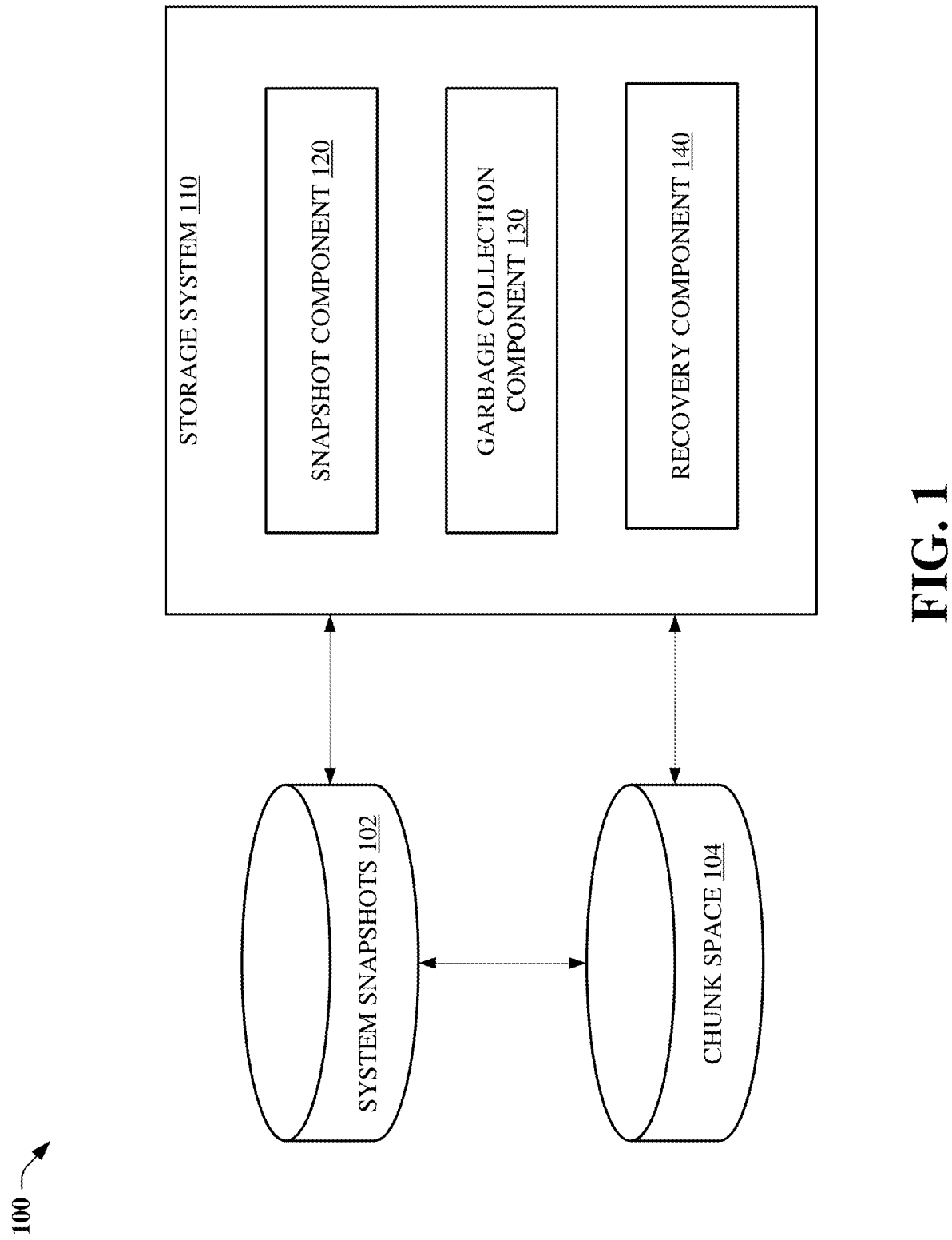
FIG. 1 illustrates a block diagram of a storage system that facilitates improved system recovery via metadata-based system snapshots based on a state of user data of the storage system, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional storage technologies have had some drawbacks with respect to recovering data using metadata-based search trees. For example, such recovery is time consuming as it requires manual iteration across different search trees until an applicable search tree combination representing lost data can be found. Further, consistent representation, via the applicable search tree combination, of a state of a system corresponding to a particular time can be difficult or impossible as data to be recovered can be stored across different storage blocks that have been referenced by disparate search trees that have been independently updated by different processes. On the other hand, various embodiments disclosed herein can improve data recovery by synchronizing metadata-based system snapshots with a state of user data.

For example, a system, e.g., storage system, can comprise a processor; and a memory that stores executable components that, when executed by the processor, facilitate performance of operations by the system, the executable components comprising: a snapshot component that generates, at respective times (e.g., periodically, in response to detection of a defined event, etc.), snapshots of roots of respective trees of the system—the respective trees comprising metadata representing respective states of the system corresponding, via the snapshots, to the respective times; and the snapshots recording respective states of the storage system to facilitate data recovery. Further, the executable component can comprise a garbage collection component that can select a snapshot, or oldest snapshot, of the snapshots of the roots that is older than remaining snapshots of the snapshots of the roots, and determine, using an object table of the snapshot referencing data chunks comprising respective objects (e.g., comprising user data) of the system, whether a data chunk of the data chunks comprises an inactive object of the respective objects to facilitate a selection of the data chunk as a garbage collection (GC) candidate for deletion via a GC procedure.

In one embodiment, in response to the data chunk being determined to comprise the inactive object, the garbage collection component can select the data chunk as the GC candidate.

In another embodiment, the garbage collection component can assign respective sequence numbers that monotonically increase to repository data chunks of the data chunks upon creation of each of the repository data chunks. Further, based on a defined criterion, the garbage collection component can select a GC front value from the respective sequence numbers that defines a scope of the GC procedure that delineates a group of the repository data chunks that is acceptable for deletion via the GC procedure—the GC front value being greater than sequence numbers of the respective sequence numbers corresponding to the group of the repository data chunks.

In this regard, in yet another embodiment, in response to the GC candidate being determined to correspond to a sequence number of the respective sequence numbers that is less than or equal to the GC front value, the garbage collection component can delete, via the GC procedure, the data chunk of the GC candidate.

In an embodiment, a tree of the respective trees comprises the object table of the snapshot that references the data chunks comprising the respective objects of the system. In another embodiment, a tree of the respective trees comprises a chunk table representing respective physical locations of the data chunks in the system, e.g., a physical location of the respective physical locations that corresponds to the data chunk comprising a node of a cluster (e.g., storage cluster), a storage device (e.g., disk drive) of the node, and a physical location within the storage device comprising a sector of the storage device and an offset from a defined logical position of the sector within the storage device. In embodiment(s), the chunk table comprises the GC front value.

In one embodiment, a method can comprise: generating, by a system comprising a processor, system snapshots of roots of respective search trees of the system—the system snapshots representing, via metadata of the search trees, respective states of the system over time; and determining, by the system, whether a data chunk corresponding to a system snapshot of the system snapshots that is older than remaining system snapshots of the system snapshots comprises an active object to facilitate preservation of the active object during a GC process until the active object has been referenced by at least one system snapshot of the system snapshots.

In another embodiment, the determining comprises: in response to the data chunk being determined, using an object data structure (e.g., object table) from the system snapshot, not to comprise the active object, determining, by the system, whether a sequence number that was assigned to the data chunk upon creation of the data chunk is less than or equal to a GC front value corresponding to the system snapshot—the GC front value delineating repository data chunks that have been approved for deletion via the GC process based on respective monotonically increasing sequence numbers that have been assigned to the repository data chunks upon creation of the repository data chunks.

In yet another embodiment, the method further comprises: in response to the sequence number that was assigned to the data chunk being determined to be less than or equal to the GC front value, deleting, by the system during the GC process, the data chunk—the repository data chunks comprising the data chunk.

In an embodiment, the deleting comprises: deleting GC ready data chunks comprising the data chunk based on a defined period—the GC ready data chunks being associated with a group of sequence numbers of the respective monotonically increasing sequence numbers that have been determined to be less than or equal to the GC front value.

In one embodiment, the determining comprises: in response to the data chunk being determined, using an object data structure from the system snapshot, to comprise the active object, excluding, by the system, the data chunk from being deleted during the GC process—the object data structure describing data chunks comprising respective objects of the system, the data chunks comprising the data chunk, and the respective objects comprising the object.

Another embodiment can comprise a machine-readable storage medium comprising instructions that, in response to execution, cause a storage system comprising a processor to perform operations, comprising: generating snapshots of roots of respective metadata based trees of the storage system representing respective states of the storage system; and in response to selecting an oldest snapshot of the snapshots that is older than remaining snapshots of the snapshots, determining, using an object data structure, e.g., object table, from the oldest system snapshot, whether a data chunk of the storage system comprises an inactive object of the storage system to facilitate deletion of the data chunk during a garbage collection GC process of the storage system—the object data structure describing data chunks comprising respective objects of the storage system, the data chunks comprising the data chunk, and the respective objects comprising the inactive object.

In one embodiment, the determining comprises: in response to the data chunk being determined to comprise an active object, excluding the data chunk from being deleted during the GC process.

In another embodiment, the determining comprises: in response to the data chunk being determined to comprise the inactive object, selecting the data chunk as a GC candidate to be deleted during the GC process.

In yet another embodiment, the operations further comprise: in response to a data sequence number that has been assigned to the data chunk upon creation of the data chunk being determined to be less than or equal to a GC front value representing a scope of the GC process with respect to a group of data chunks that have been stored in a data repository of the storage system, deleting, via the GC process, the data chunk—the scope being based on data sequence numbers, comprising the data sequence number, that have been assigned to the group of data chunks, and the group of data chunks comprising the data chunk.

In an embodiment, the operations can further comprise: in response to a data sequence number that has been assigned to the data chunk upon creation of the data chunk being determined to be greater than a GC front value representing a scope of the GC process with respect to a group of data chunks that have been stored in a data repository of the storage system, excluding the data chunk from being deleted via the GC process—the scope being based on data sequence numbers, comprising the data sequence number, that have been assigned to the group of data chunks, and the group of data chunks comprising the data chunk.

As described above, conventional storage technologies utilizing metadata-based search trees for storage operations have had some drawbacks with respect to being susceptible to data loss when roots of corresponding search trees are lost or corrupted. Further, recovery of data using search trees is onerous—requiring manual iteration through different search trees that have been independently updated, until an applicable combination of search trees may be found to replicate an appropriate version of lost data.

In contrast, various embodiments described herein can facilitate automated, consistent recovery of a system state by synchronizing snapshots of metadata representing respective system states with a state of user data, e.g., by preserving a live/active during a GC process until the live/active object has been referenced by snapshot(s) of the system. For example, and now referring to FIG. 1, a block diagram of a storage system (110) that facilitates improved system recovery via metadata-based snapshots based on a state of user data of the storage system is illustrated, in accordance with various example embodiments. In this regard, the storage system can comprise an object storage system, e.g., a file system, comprising, but not limited to comprising, a Dell EMC® Isilon file storage system (e.g., 1400), e.g., an elastic cloud storage (ECS) system. In other embodiment(s), the storage system can comprise a host server, a client server, etc. In yet other embodiment(s), various components of the storage system can be included in a host application, a client application, etc.

Figure 14:
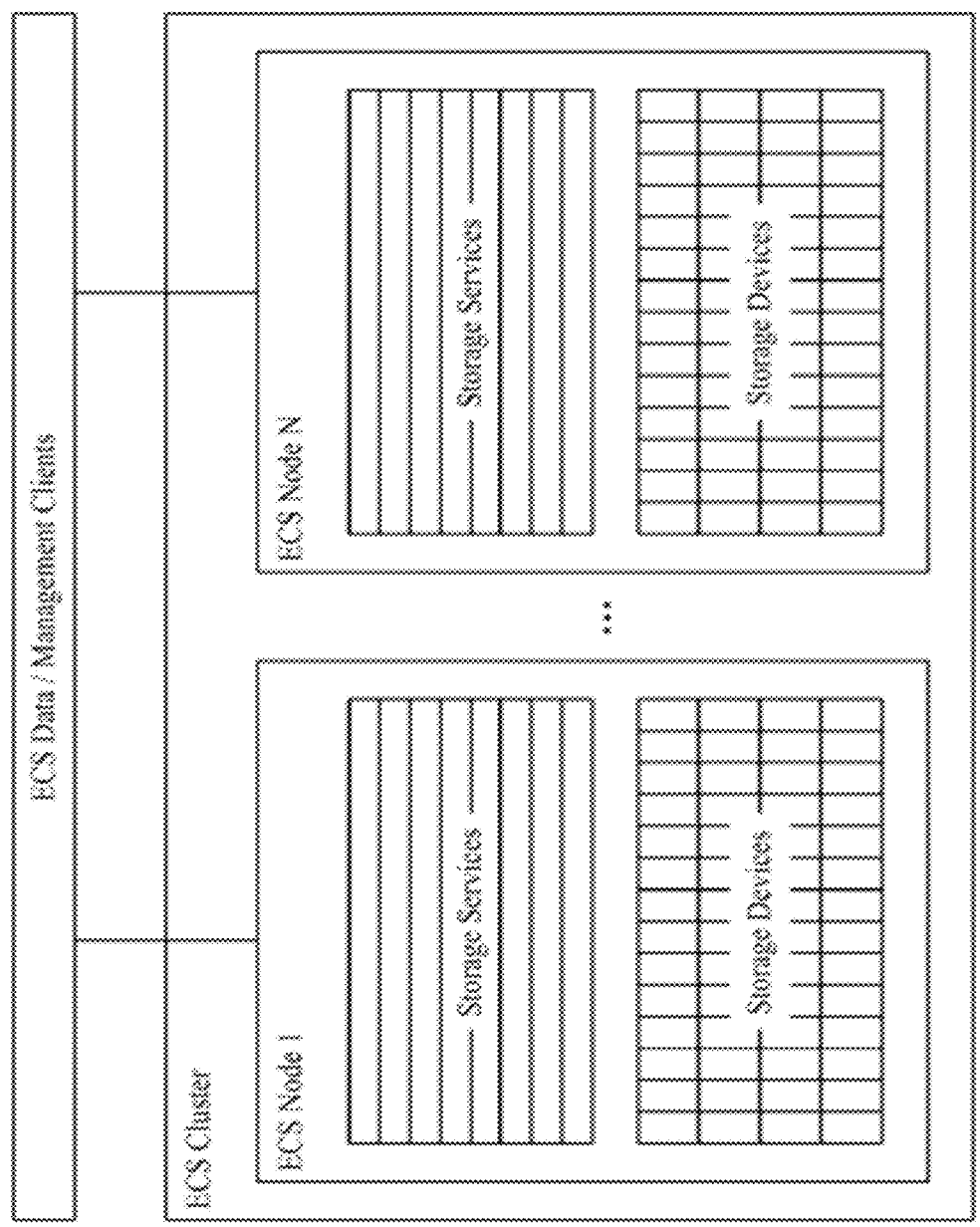
FIG. 14 illustrates a block diagram of an elastic cloud storage (ECS) system, in accordance with various example embodiments.

As illustrated by FIG. 14, the Dell EMC® Isilon file storage system can comprise a cloud-based object storage appliance in which corresponding storage control software comprising, e.g., ECS data client(s), ECS management client(s), storage service(s), etc. and storage devices, storage media, etc., e.g., physical magnetic disk media, storage devices, etc. of respective ECS nodes of an ECS cluster, are combined as an integrated system with no access to the storage media other than through the ECS system.

As used herein, the term "cloud" can refer to a cluster, data storage cluster, etc. comprising a group of nodes, storage nodes, etc., e.g., comprising a group of network servers (e.g., comprising storage devices, disk drives, etc.), within a distributed, e.g., globally distributed, storage system—the group of storage nodes being communicatively and/or operatively coupled to each other, and hosting a group of applications utilized for servicing user requests. In general, the storage nodes can communicate with user devices via wired and/or wireless communication network(s) to provide access to services that are based in the cloud and not stored locally, e.g., on a user device. A typical cloud-computing environment can include multiple layers, aggregated together, which interact with each other to provide resources for end-users.

The ECS system can support storage, manipulation, and/or analysis of unstructured data on a massive scale on commodity hardware. As an example, the ECS system can support mobile, cloud, big data, and/or social networking applications. In another example, the ECS system can be deployed as a turnkey storage appliance, or as a software product that can be installed on a set of qualified commodity servers and disks, e.g., within a node, data storage node, etc. of a cluster, data storage cluster, etc. In this regard, the ECS system can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the ECS system can write all object-related data, e.g., user data, metadata, object location data, etc. to logical containers of contiguous disk space, e.g., such containers comprising a group of blocks of fixed size (e.g., 128 MB) known as chunks. In this regard, user data is stored in repository (or repo) chunks (e.g., included in chunk space 104). The repo chunks can be shared, e.g., one chunk can comprise data fragments of different user objects. Further, B+ trees (described below) are stored in tree chunks, and tree journals (described below) are stored in journal chunks. Furthermore, chunk content is modified in append-only mode, e.g., such content being protected from being erased or overwritten for a specified retention period. When a chunk becomes full enough, it is sealed and/or closed—becoming immutable, e.g., read-only and delete only.

Figure 2:
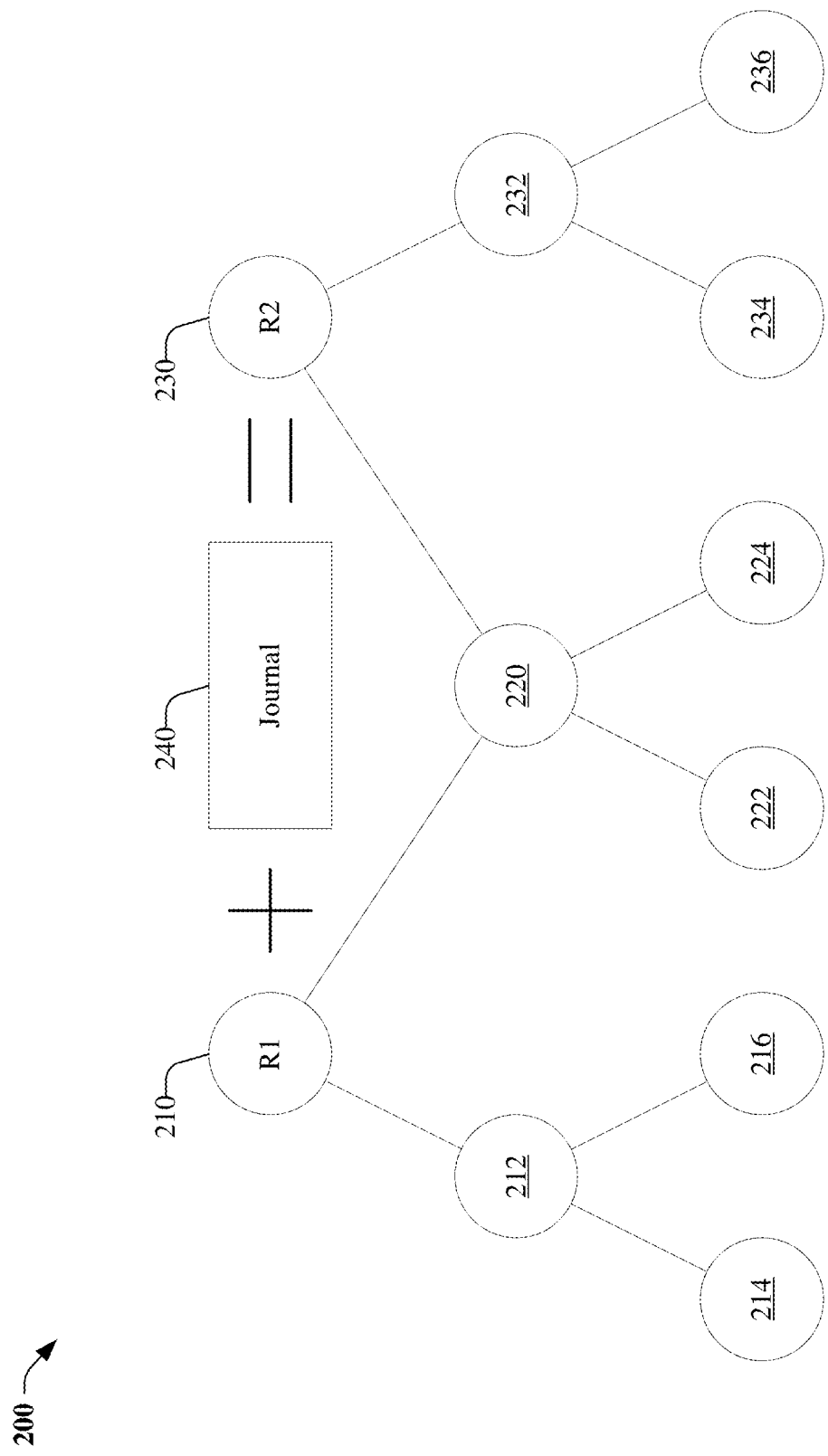
FIG. 2 illustrates a block diagram of a search tree of a storage system that has been updated, and a journal that can be used to facilitate recovery of a state of the storage system after such update, in accordance with various example embodiments.

Referring now to FIG. 2, the ECS system uses B+ trees, or search trees, comprising metadata to describe a state of the ECS system including a state of user data, or objects (not shown), that have been stored in respective user data, e.g., repo, chunks (not shown), of chunk space 104. In this regard, a B+ tree (e.g., 210, 230) comprises a root ("R1", "R2", etc.), internal nodes (e.g., 212, 220, 232), and leaves (e.g., 214, 216, 222, 224, 234, 236, etc.) that are stored in a tree chunk (not shown). For example, the ECS system uses an object table (OT) comprising a B+ tree to describe respective chunk locations of all user data, objects, repo chunks, etc. in the ECS system, e.g., within chunk space 104.

Each B+ tree has a tree journal, or journal, referencing data updates associated with the B+ tree. In this regard, FIG. 2 illustrates a search tree (210) that has been updated, e.g., via addition of root R2 of a new search tree (230), and a journal (240) comprising information representing update(s) that have been made to the search tree, e.g., to facilitate recovery of a state of the storage system affected by the update. The ECS system uses a chunk table comprising a B+ tree to describe respective physical locations, e.g., clusters, nodes, disks, sectors, offsets, etc. of respective repo chunks within the ECS system.

Further, immutability (see above) of data chunks also means that all tree elements are immutable. Each tree update incurs a reallocation of at least N pages, where N is a current depth of the tree. In particular, a root of a tree changes after each update of the tree, and updating a tree journal is an expensive operation with respect to use of processing resources. As such, a tree journal of a tree is not updated after a single data update of the tree.

In this regard, when a journal becomes full, e.g., references a defined amount of tree updates, does not have free chunk(s) available to reference further changes of a corresponding tree, etc. a journal process implements a bulk tree update in order to minimize a total cost of updating the tree. The bulk tree update results in creation of a new tree because a root of a tree changes when the tree has been modified. In many cases, an old tree and new tree share elements, e.g., nodes, leaves, etc.

It should be appreciated that in various embodiments disclosed herein with respect to performing a snapshot (e.g., comprising a point-in-time copy, via metadata of respective search trees, of a state of the storage system (e.g., representing respective states of object-related data, e.g., user data, metadata, object location data, etc.)), object-related data is assumed to be immutable during performance of snapshot operation(s). Further, it should be appreciated that system snapshots (102) and chunk space (104) can comprise physical storage device(s), virtual storage device(s), hard disk drive(s), cloud based storage device(s), etc.

Referring again to FIG. 1, a plurality of system trees (not shown) that have been stored in the system snapshots (102) describes a current system state of the storage system including a state of user data. In this regard, a snapshot component (120) can generate, at respective times (e.g., periodically, in response to detection of a defined event, etc.), snapshots of roots of respective trees of the storage system—the respective trees comprising metadata representing respective states of the storage system corresponding, via the snapshots of the roots of the respective trees, to the respective times; and the snapshots recording respective states of the storage system to facilitate data recovery.

In embodiment(s), the snapshot component can perform a snapshot of the roots as an instant, atomic, all at once, grouped root, etc. operation to assure consistency of a system state described by the snapshot. In other embodiment(s), the snapshot component can periodically, e.g., every 24 hours, create snapshots of the storage system. In yet other embodiment(s), the snapshot component can perform a snapshot of the roots in response to detection of a defined event, e.g., upon detection of an update that has been performed on software and/or hardware components of the storage system.

Data must remain restorable, which means that live/active objects that are accessible, e.g., can be read, written, updated, etc. via client device(s), should not be subject to a garbage collection (GC) process. Garbage collection in the ECS system works at the chunk level, and respective GC processes are performed for each chunk type. Further, the respective GC processes scan trees to detect unused chunks, e.g., chunks not being occupied by live/active objects.

For example, the garbage collection component can comprise a GC process for repo chunks, e.g., corresponding to user data, and the GC process for repo chunks can scan an object table (OT) to detect repo chunks that are not occupied by live/active objects. As each system snapshot includes a corresponding OT version, the garbage collection component can facilitate production, via the snapshot component, of consistent snapshots of the storage system by synchronizing the snapshots with a state of user data, e.g., by excluding older live/active user data from being deleted via the GC process.

In this regard, the snapshot component can select a snapshot, oldest snapshot, etc. of snapshots of roots of respective trees of the storage system that is older than remaining snapshots of the snapshots, and determine, using an OT of the oldest snapshot that references data chunks comprising respective objects of the storage system, whether a data chunk of the data chunks comprises an inactive object of the respective objects to facilitate a selection of the data chunk as a GC candidate for deletion via a GC procedure. In turn, in response to the data chunk being determined to comprise the inactive object, the garbage collection component can select the data chunk as the GC candidate.

In another embodiment, to prevent the GC procedure from deleting new, recently created, and inactive chunks, the garbage collection component can assign respective sequence numbers that monotonically increase to repo data chunks of the data chunks upon creation of each of the repo data chunks. Further, based on a defined criterion, the garbage collection component can select a GC front value from the respective sequence numbers that defines a scope of the GC procedure that delineates a group of the repo data chunks that is acceptable for deletion via the GC procedure—the GC front value being greater than sequence numbers of the respective sequence numbers corresponding to the group of the repo data chunks.

For example, in embodiment(s), the garbage collection component can select the GC front value based on objects that have been determined to be referenced by an OT, e.g., assigning monotonically increasing sequence numbers to the objects as they become referenced by the OT, and assigning the GC front value to a sequence number that is greater than the assigned monotonically increasing sequence numbers.

In turn, in yet another embodiment, in response the GC candidate being determined to correspond to a sequence number of the respective sequence numbers that is less than or equal to the GC front value, the garbage collection component can delete, via the GC procedure, the data chunk of the GC candidate.

In an embodiment, a tree of the respective trees comprises the object table of the snapshot referencing the data chunks comprising the respective objects of the storage system. In another embodiment, a tree of the respective trees comprises a chunk table comprising the GC front value and representing respective physical locations of the data chunks in the storage system, e.g., a physical location of the respective physical locations corresponding to the data chunk and referencing a node of a cluster (e.g., storage cluster), a storage device (e.g., disk drive) of the node, and a physical location within the storage device comprising a sector of the storage device and an offset from a defined logical position of the sector within the storage device.

FIGS. 3-7 illustrate block diagrams of respective states of the storage system representing a loss of a root of a tree of the storage system, and a recovery of the root using snapshot(s), in accordance with various example embodiments. In this regard, after a failure of the storage system, e.g., which has been caused by corruption of the root of the tree of the storage system, a recovery component (140) can initially attempt to recover the tree using a most recent snapshot of the storage system. In the event such recovery fails, the recovery component can attempt to recover the tree using a next recent snapshot, and so on. As such, the recovery component iteratively utilizes journals to "replay", recover, etc. respective states of the storage system.

Figure 3:
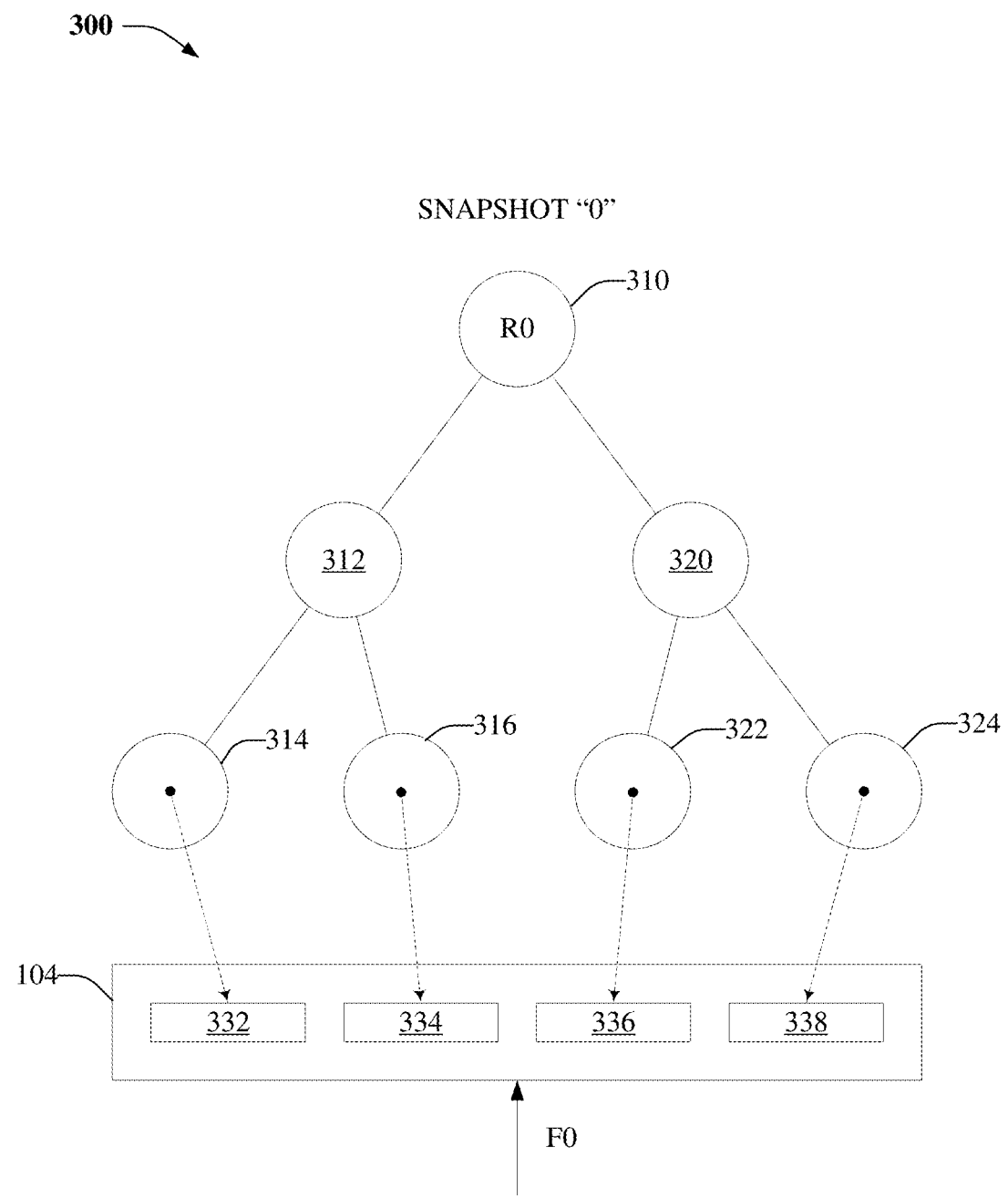
FIG. 3 illustrates a block diagram of an initial snapshot of a root of an object table comprising a search tree of a storage system representing an initial state of the storage system, in accordance with various example embodiments.

FIG. 3 illustrates an initial state of the storage system represented by a first snapshot ("S0"), in accordance with various example embodiments. Snapshot S0 comprises root "R0" of tree 310, which comprises nodes (312, 320) that comprise keys. The nodes are connected to leaves (314, 316, 322, and 324), which comprise key/value pairs referencing respective chunks (332, 334, 336, 338) in the chunk space (104). Further, a GC front value "F0" that has been assigned to the chunk space is greater than sequence numbers corresponding to chunks 332 and 334, but less than sequence numbers corresponding to chunks 336 and 338.

Figure 4:
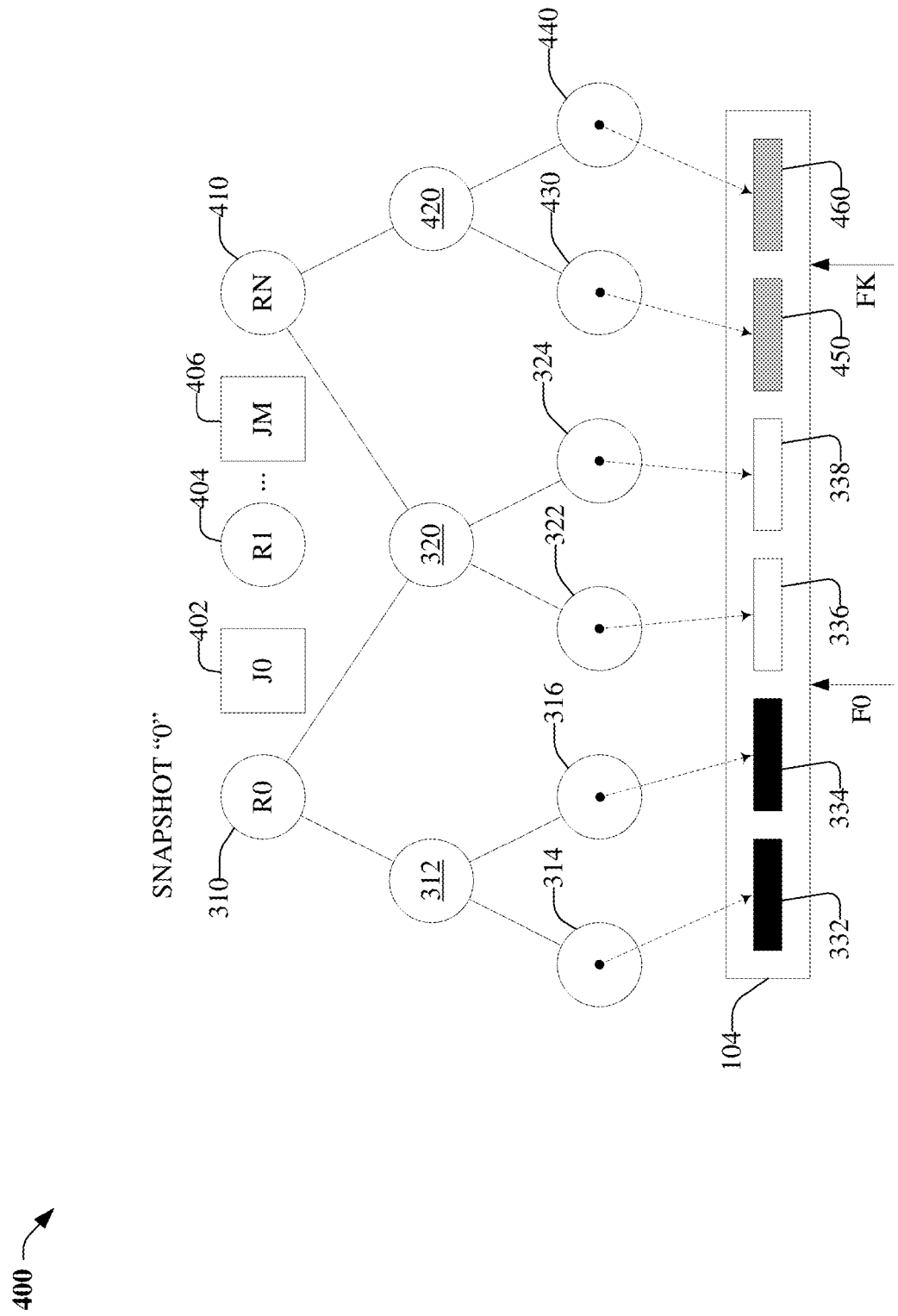
FIG. 4 illustrates a block diagram of an object table of a storage system comprising a new tree representing an update of the storage system, in accordance with various example embodiments.

In turn, FIG. 4 illustrates several updates that have been made to the storage system, represented by journals "J0" (402) to "JM" (406). In this regard, a new tree version (410) with root "RN" was created to reference, via node 420 and leaves 430 and 440, new data chunks 450 and 460 that were created in the chunk space. Old data (332 and 334) was deleted. Further, a new GC front value "FK" was assigned to the chunk space—FK being greater than sequence numbers corresponding to chunks 336, 338, and 450; and being less than a sequence number corresponding to chunk 460. The garbage collection component can preserve old and new data using root R0 and GC front value F0, and preserve journals J0 to JM representing the updates that have been made to the storage system, e.g., root "R1" (404) being included in the updates.

Figure 5:
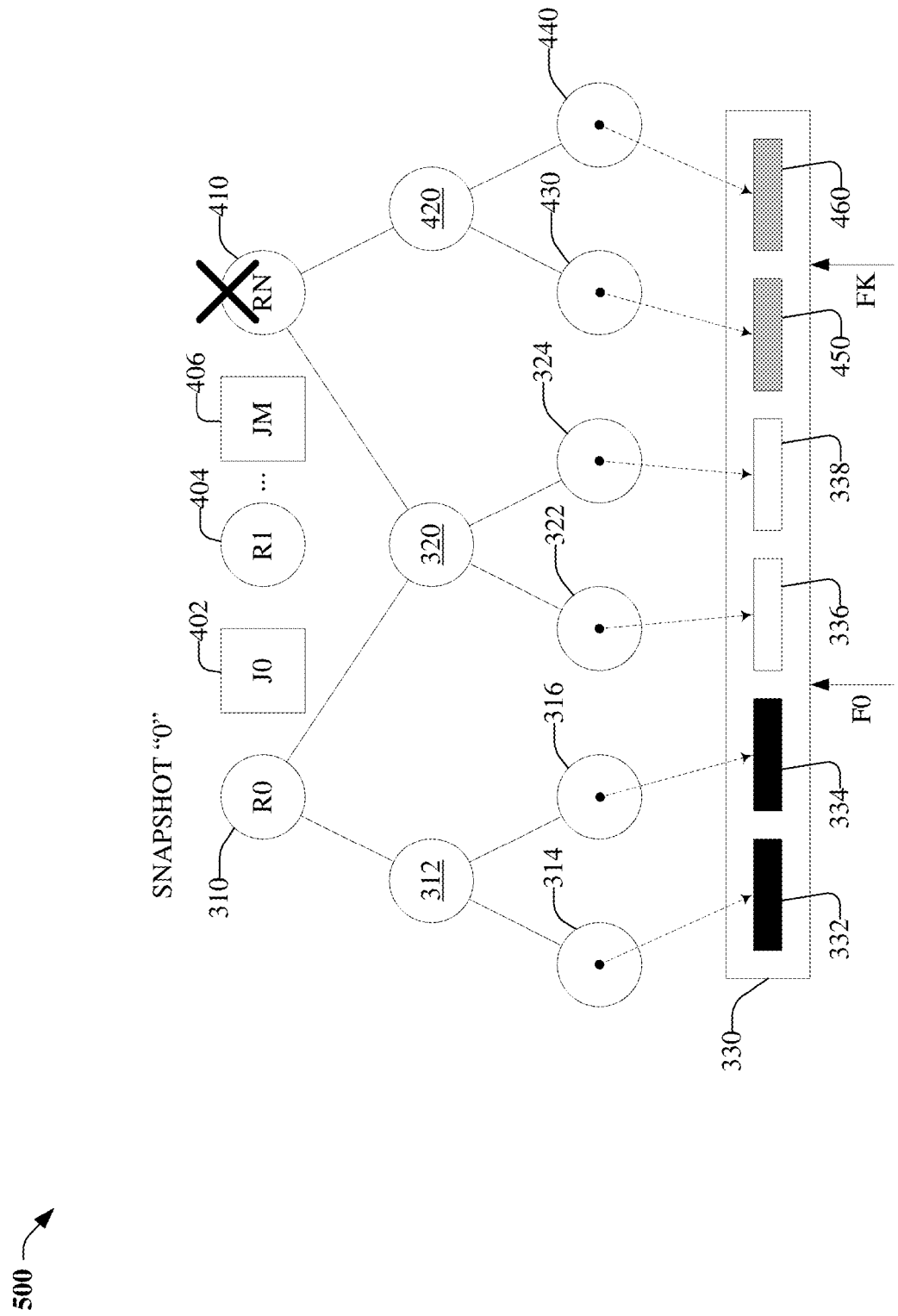
FIG. 5 illustrates a block diagram of a root of an object table of a storage system that is lost or corrupt, in accordance with various example embodiments.
Figure 6:
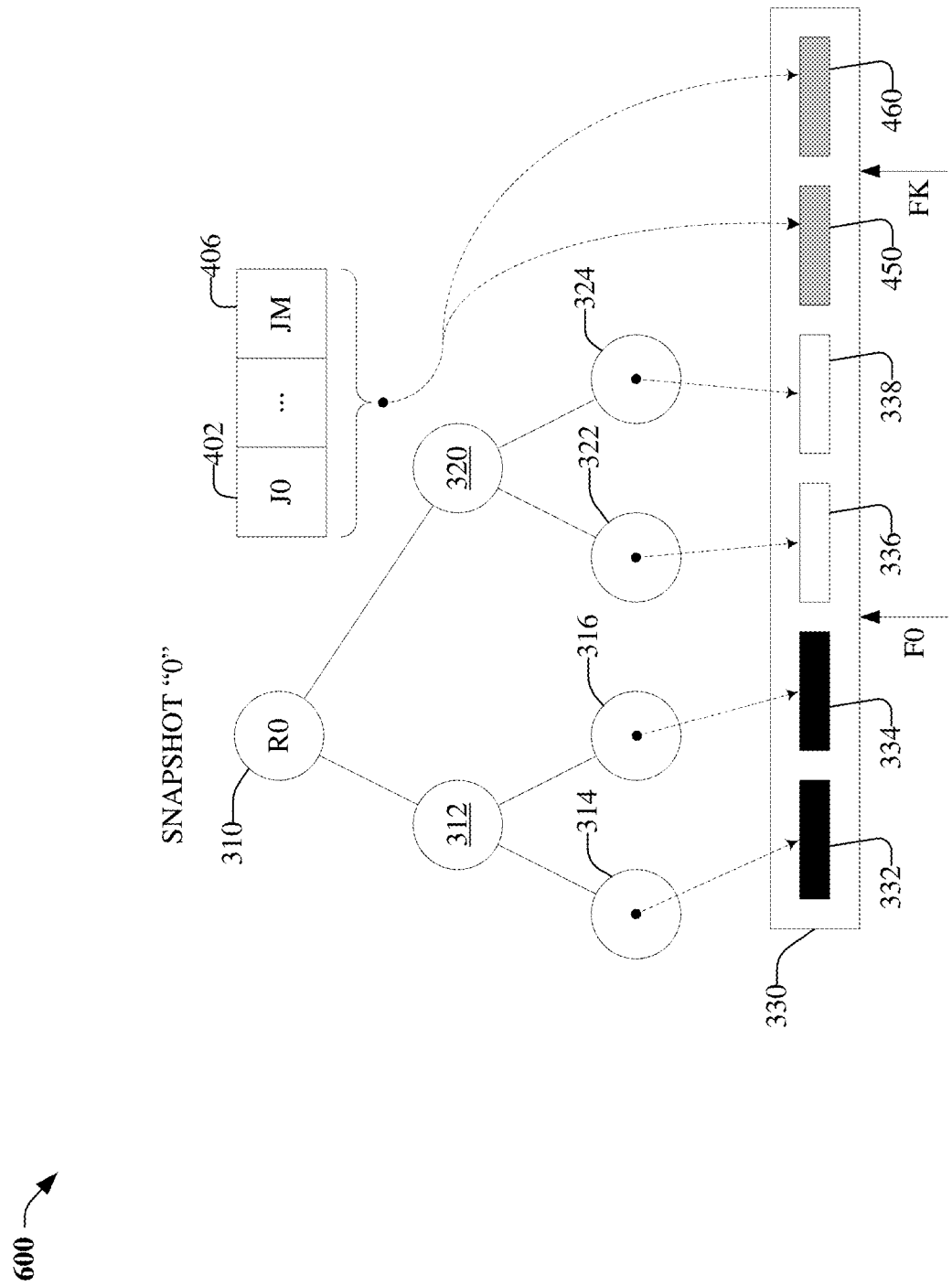
FIG. 6 illustrates a block diagram of an object table of a storage system being recovered based on a most recent snapshot of a root of the object table, in accordance with various example embodiments.
Figure 7:
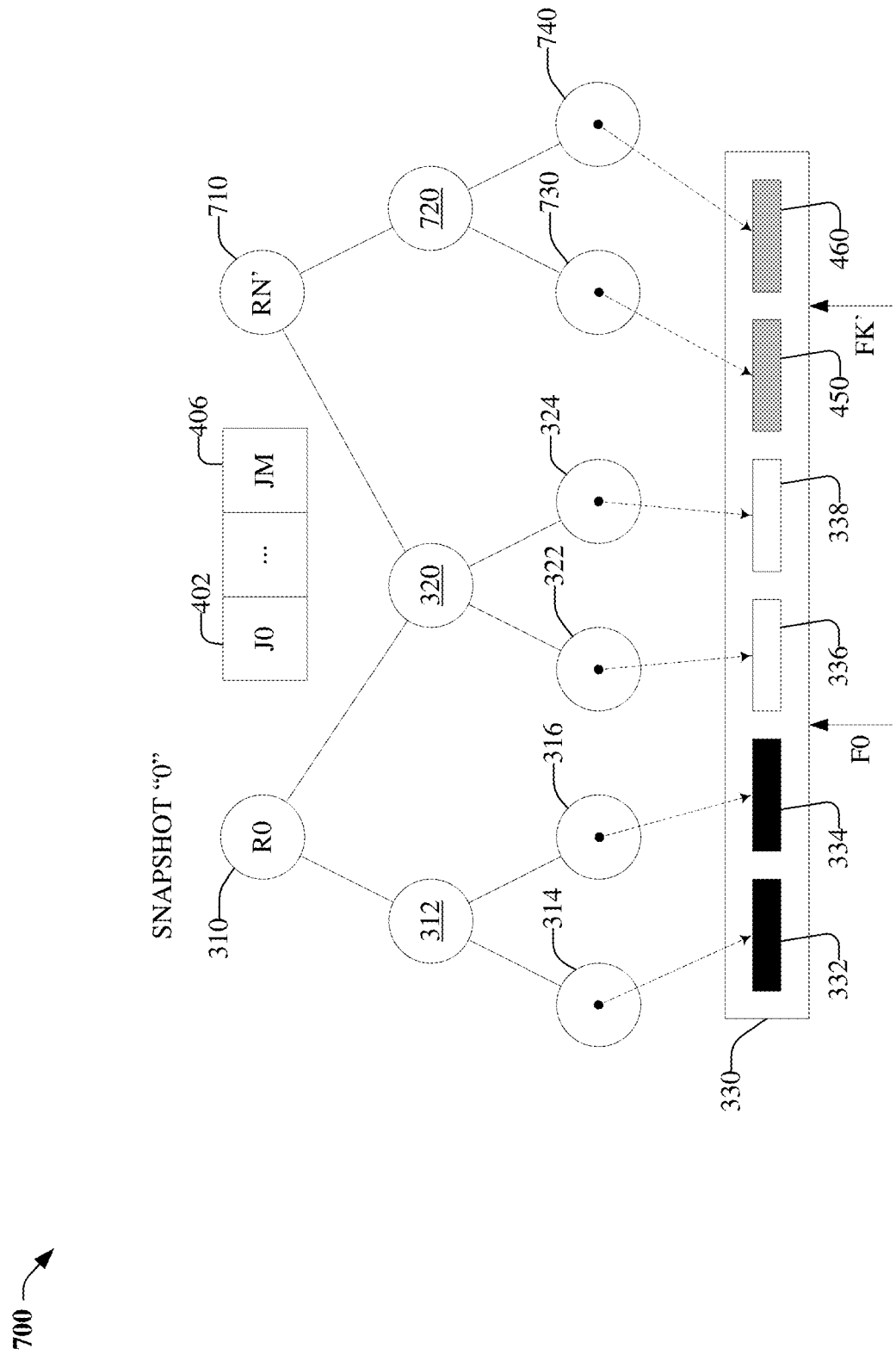
FIG. 7 illustrates a block diagram of an object table of a storage system that was recovered based on a most recent snapshot of a root of the object table, in accordance with various example embodiments.

FIG. 5 illustrates root RN becoming lost/corrupt, which results in objects referenced by root RN (450, 460) becoming unavailable. In turn, as illustrated by FIG. 6, the recovery component can utilize the most recent snapshot (S0) of the storage system, along with journals J0 to JM to "re-play" updates that had been made to the storage system after the most recent snapshot to recover a system state of the storage system. In this regard, the recovery component obtains, from the journals, references to data chunks 450 and 460, and referring now to FIG. 7, creates a new tree version (710) comprising root "RN'", node 720, and leaves 730 and 740 comprising the references to data chunks 450 and 460, respectively. As a result, all objects that have not been deleted from the chunk space become available.

Figure 8:
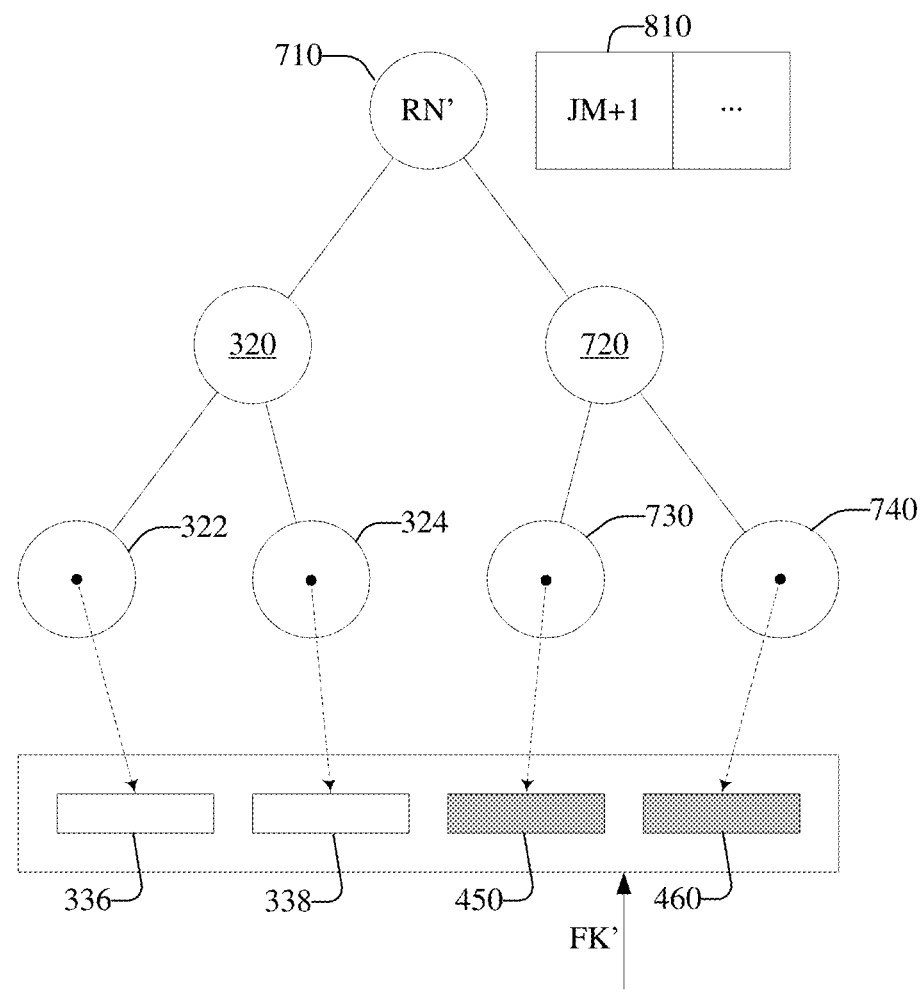
FIG. 8 illustrates a block diagram of a new snapshot of a root of an object table of a storage system after the storage system was recovered based on a most recent snapshot of the root, in accordance with various example embodiments.

In this regard, FIG. 8 illustrates a revised state of the storage system represented by a second snapshot ("S1") that comprises root RN' of tree 710, which comprises nodes (320, 720) that are connected to respective leaves (322, 324, 730, 740) that reference respective chunks (336, 338, 450, 460) in the chunk space. Updates that were performed to obtain the revised state represented by the second snapshot are referenced by journal "JM+1" (810). Further, a revised GC front value "FK'" has been assigned to the chunk space, FK' being greater than sequence numbers corresponding to chunks 336, 338, and 450, but less than sequence numbers corresponding to chunk 460.

FIGS. 9-13 illustrate methodologies for performing operations corresponding to data storage environments (e.g., 100) that facilitate improved system recovery via metadata-based system snapshots based on a state of user data within such environments, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
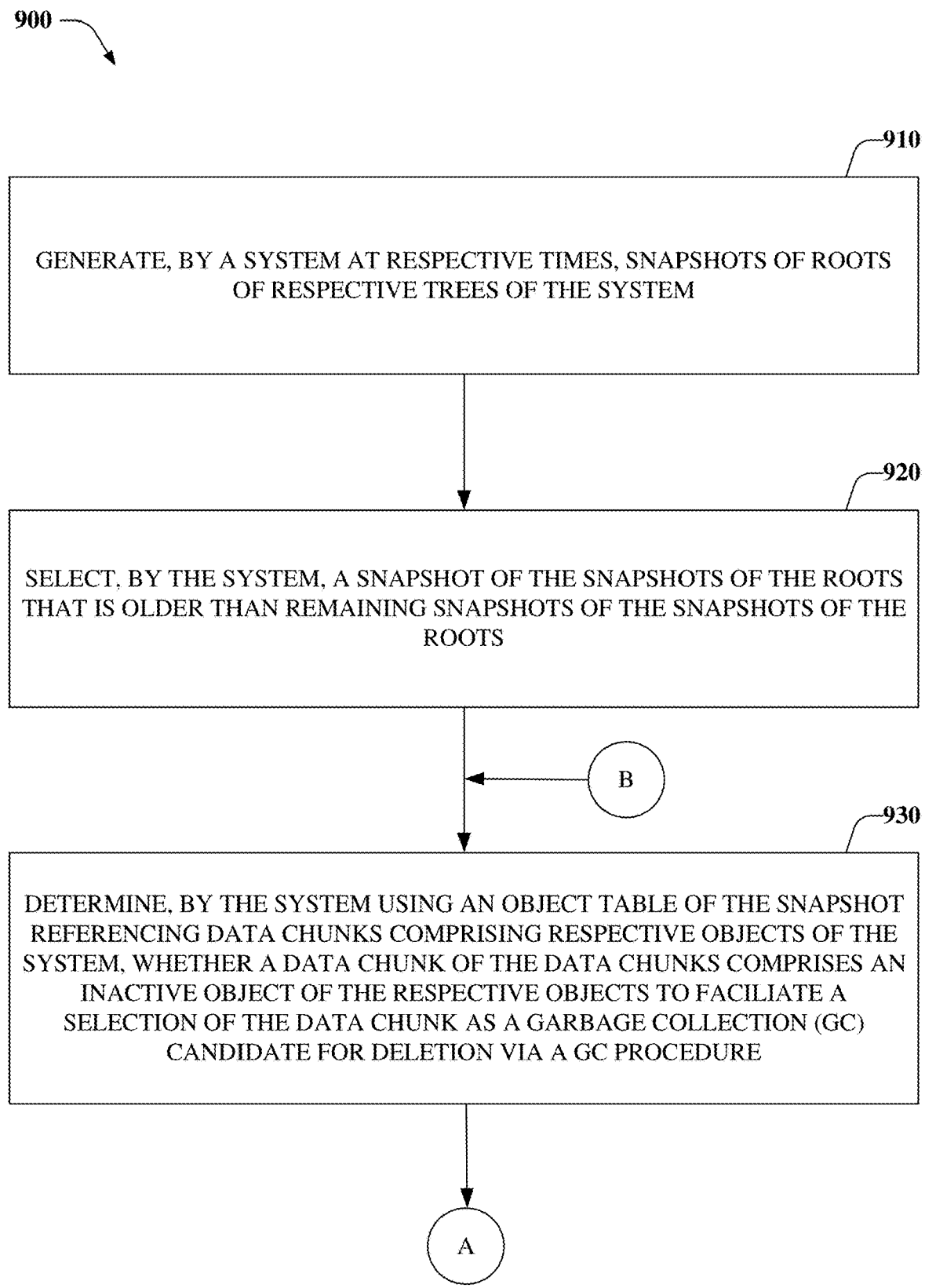
FIGS. 9-11 illustrate flow charts of a method associated with recovery of a storage system via metadata-based system snapshots based on a state of user data of the storage system, in accordance with various example embodiments.
Figure 10:
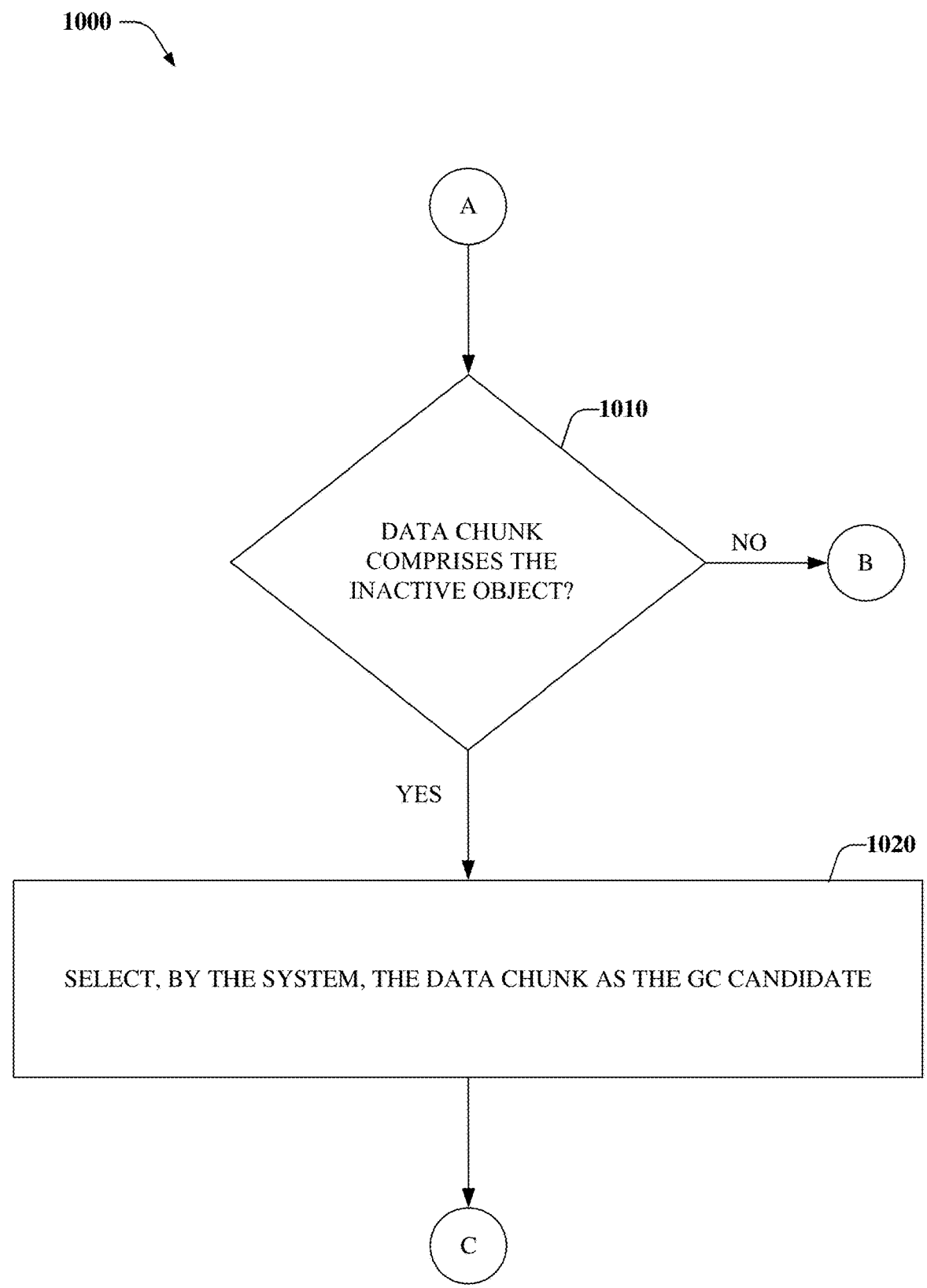
Figure 11:
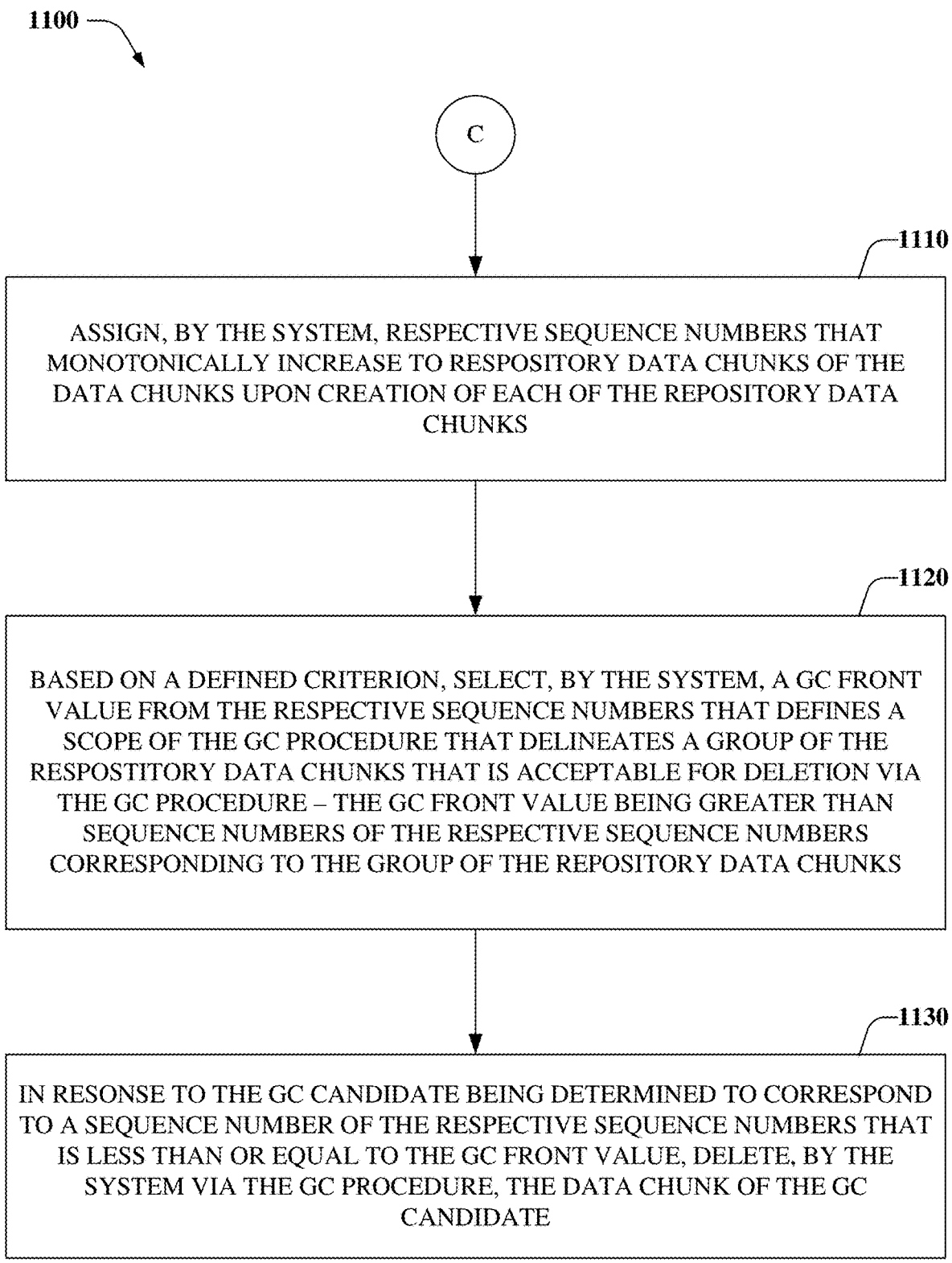

Referring now to FIGS. 9-11, a method associated with synchronization of snapshots of metadata representing respective system states with a state of user data is illustrated, in accordance with various example embodiments. At 910, a system (e.g., 110) comprising a processor can generate, at respective times, snapshots of roots of respective trees of the system. At 920, the system can select a snapshot, or oldest snapshot, of the snapshots of the roots that is older than remaining snapshots of the snapshots of the roots. At 930, the system can determine, using an OT of the oldest snapshot referencing data chunks comprising respective objects of the system, whether a data chunk of the data chunks comprises an inactive object of the respective objects to facilitate a selection of the data chunk as a garbage collection candidate for deletion via a GC procedure.

At 1010, in response to the data chunk being determined to comprise the inactive object, flow continues to 1020, at which the system can select the data chunk as the GC candidate; otherwise flow returns to 930.

Flow continues from 1020 to 1110, at which the system can assign respective sequence numbers that monotonically increase to repository data chunks of the data chunks upon creation of each of the repository data chunks. At 1120, the system can select, based on a defined criterion, a GC front value from the respective sequence numbers that defines a scope of the GC procedure that delineates a group of the repository data chunks that is acceptable for deletion via the GC procedure—the GC front value being greater than sequence numbers of the respective sequence numbers corresponding to the group of the repository data chunks.

For example, in embodiment(s), the system can select the GC front value based on objects that have been determined to be referenced by an OT, e.g., the respective sequence numbers being assigned to the repository data chunks as they become referenced by the OT, and the GC front value being assigned to a sequence number that is greater than the respective sequence numbers that have been assigned to the repository data chunks—the group of the repository data chunks comprising such repository data chunks.

In this regard, in response to the GC candidate being determined, by the system at 1130, to correspond to a sequence number of the respective sequence numbers that is less than or equal to the GC front value, the system can delete, via the GC procedure, the data chunk of the GC candidate.

Figure 12:
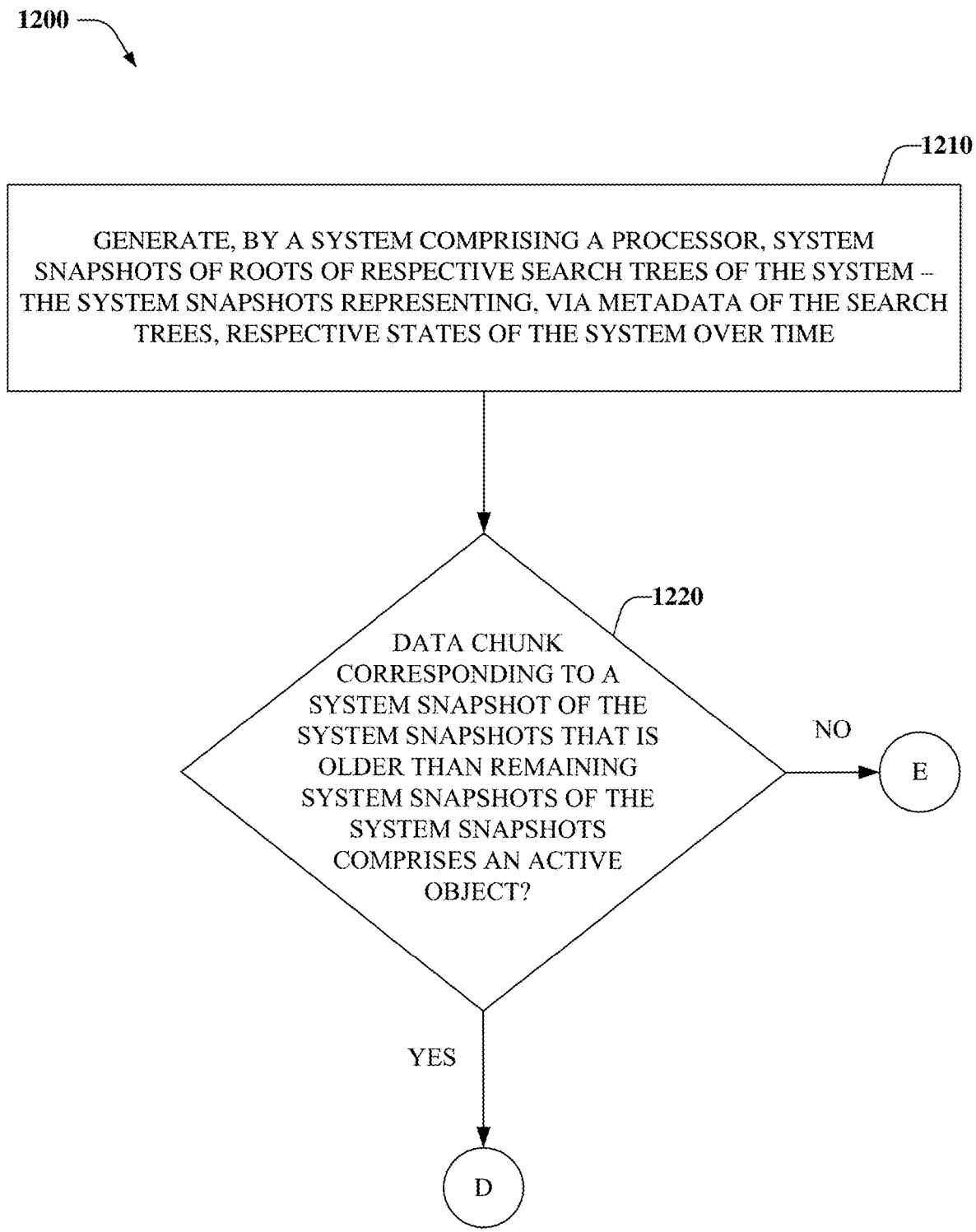
FIGS. 12-13 illustrate flow charts of another method associated with recovery of a storage system via snapshots based on a state of user data of the storage system, in accordance with various example embodiments.
Figure 13:
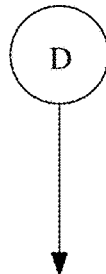
Figure 13:
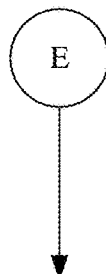

FIGS. 12-13, illustrate another method associated with synchronization of snapshots of metadata representing respective system states with a state of user data, in accordance with various example embodiments. At 1210, a system (e.g. 110) comprising a processor can generate system snapshots of roots of respective search trees of the system—the system snapshots representing, via metadata of the search trees, respective states of the system over time. At 1220, the system can determine whether a data chunk corresponding to a system snapshot of the system snapshots that is older than remaining system snapshots of the system snapshots comprises an active object. In this regard, if it has been determined that the data chunk comprises the active object, flow continues to 1310, at which the system can exclude the data chunk from being deleted during the GC process.

On the other hand, if it has been determined that the data chunk does not comprise the active object, flow continues to 1320, at which the system can, in response to a sequence number that was assigned to the data chunk upon creation of the data chunk being determined to be less than or equal to a GC front value corresponding to the system snapshot, delete the data chunk during the GC process.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic", "logical", "logically", and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component", "system", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via the snapshot component (120), to generate, at respective times, snapshots of roots of respective trees of a system—the respective trees comprising metadata representing respective states of the system corresponding, via the snapshots, to the respective times. Further, the artificial intelligence system can be used, via the garbage collection component (130), to select a snapshot of the snapshots of the roots that is older than remaining snapshots of the snapshots of the roots, and determine, using an object table of the snapshot referencing data chunks comprising respective objects of the system, whether a data chunk of the data chunks comprises an inactive object of the respective objects to facilitate a selection of the data chunk as a GC candidate for deletion via a GC procedure, as described herein.

A classifier can be a function that maps an input attribute vector, $x=(x1, x2, x3, x4, xn)$, to a confidence that the input belongs to a class, that is, $f(x)=$confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by storage system 110.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "chunk space", "system snapshots", "storage medium", "cluster", "data storage cluster", "nodes", "storage nodes", "disk", "disk drive", "storage devices", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in system snapshots (102), chunk space (104), non-volatile memory 1522 (see below), disk storage 1524 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory 1520 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 15:
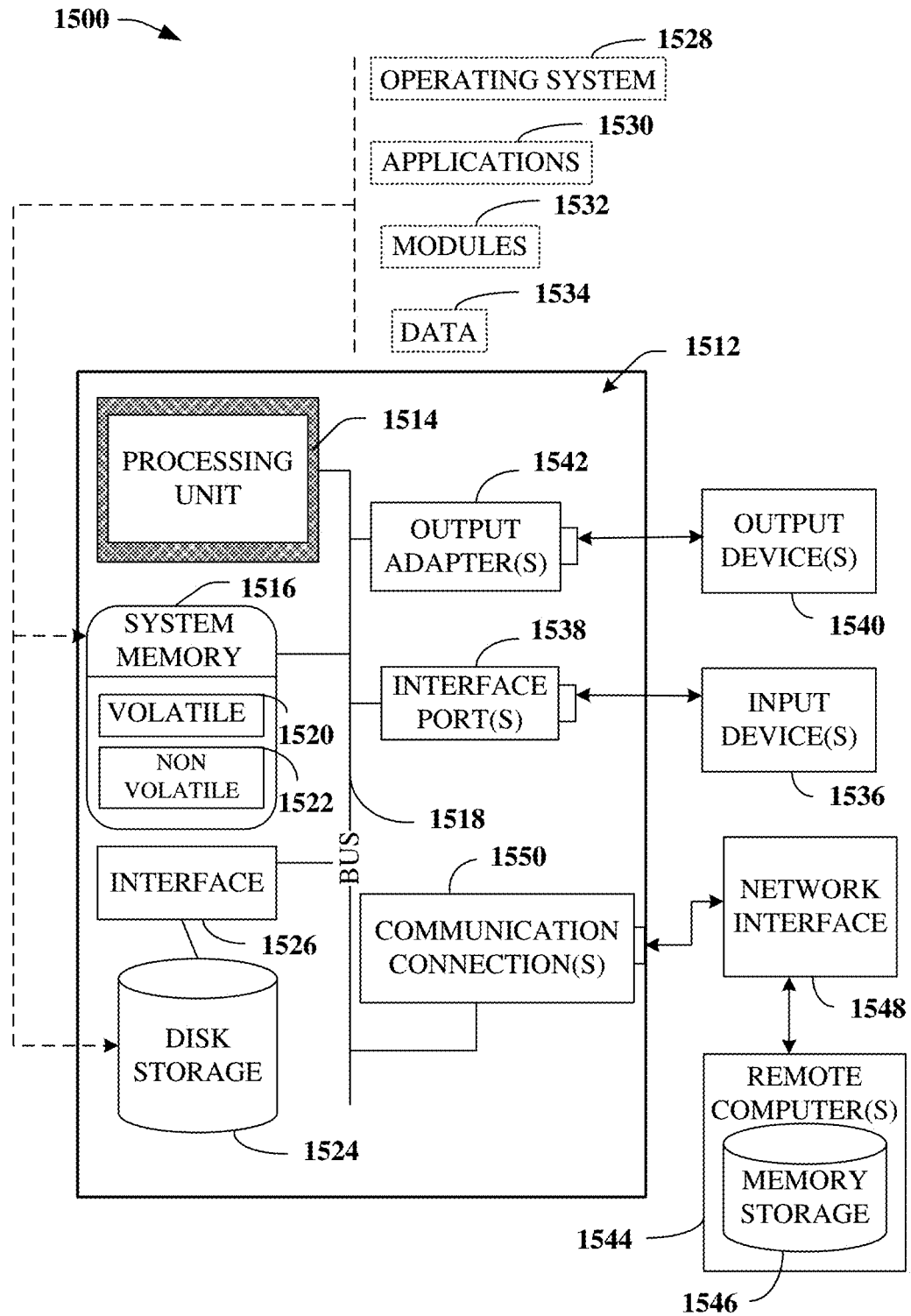
FIG. 15 illustrates a block diagram representing an illustrative non-limiting computing system or operating environment in which one or more aspects of various embodiments described herein can be implemented.

In order to provide a context for the various aspects of the disclosed subject matter, FIG. 15, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, minicomputing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 15, a block diagram of a computing system 1500, e.g., storage system 110, operable to execute the disclosed systems and methods is illustrated, in accordance with an embodiment. Computer 1512 comprises a processing unit 1514, a system memory 1516, and a system bus 1518. System bus 1518 couples system components comprising, but not limited to, system memory 1516 to processing unit 1514. Processing unit 1514 can be any of various available processors. Dual microprocessors and other multiprocessor architectures also can be employed as processing unit 1514.

System bus 1518 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1516 comprises volatile memory 1520 and nonvolatile memory 1522. A basic input/output system (BIOS), containing routines to transfer information between elements within computer 1512, such as during start-up, can be stored in nonvolatile memory 1522. By way of illustration, and not limitation, nonvolatile memory 1522 can comprise ROM, PROM, EPROM, EEPROM, or flash memory. Volatile memory 1520 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 also comprises removable/non-removable, volatile/non-volatile computer storage media. FIG. 15 illustrates, for example, disk storage 1524. Disk storage 1524 comprises, but is not limited to, devices like a magnetic disk drive, floppy disk drive, tape drive, Jaz drive, Zip drive, LS-100 drive, flash memory card, or memory stick. In addition, disk storage 1524 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to system bus 1518, a removable or non-removable interface is typically used, such as interface 1526.

It is to be appreciated that FIG. 15 describes software that acts as an intermediary between users and computer resources described in suitable operating environment 1500. Such software comprises an operating system 1528. Operating system 1528, which can be stored on disk storage 1524, acts to control and allocate resources of computer system 1512. System applications 1530 take advantage of the management of resources by operating system 1528 through program modules 1532 and program data 1534 stored either in system memory 1516 or on disk storage 1524. It is to be appreciated that the disclosed subject matter can be implemented with various operating systems or combinations of operating systems.

A user can enter commands or information into computer 1512 through input device(s) 1536. Input devices 1536 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1514 through system bus 1518 via interface port(s) 1538. Interface port(s) 1538 comprise, for example, a serial port, a parallel port, a game port, a universal serial bus (USB), a wireless based port, e.g., Wi-Fi, Bluetooth, etc. Output device(s) 1540 use some of the same type of ports as input device(s) 1536.

Thus, for example, a USB port can be used to provide input to computer 1512 and to output information from computer 1512 to an output device 1540. Output adapter 1542 is provided to illustrate that there are some output devices 1540, like display devices, light projection devices, monitors, speakers, and printers, among other output devices 1540, which use special adapters. Output adapters 1542 comprise, by way of illustration and not limitation, video and sound devices, cards, etc. that provide means of connection between output device 1540 and system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. Remote computer(s) 1544 can be a personal computer, a server, a router, a network PC, a workstation, a microprocessor based appliance, a peer device, or other common network node and the like, and typically comprises many or all of the elements described relative to computer 1512.

For purposes of brevity, only a memory storage device 1546 is illustrated with remote computer(s) 1544. Remote computer(s) 1544 is logically connected to computer 1512 through a network interface 1548 and then physically and/or wirelessly connected via communication connection 1550. Network interface 1548 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1550 refer(s) to hardware/software employed to connect network interface 1548 to bus 1518. While communication connection 1550 is shown for illustrative clarity inside computer 1512, it can also be external to computer 1512. The hardware/software for connection to network interface 1548 can comprise, for example, internal and external technologies such as modems, comprising regular telephone grade modems, cable modems and DSL modems, wireless modems, ISDN adapters, and Ethernet cards.

The computer 1512 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1512 can connect to other devices/networks by way of antenna, port, network interface adaptor, wireless access point, modem, and/or the like.

The computer 1512 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable components that, when executed by the processor, facilitate performance of operations by the system, the executable components comprising:
a snapshot component that generates, at respective times, snapshots of roots of respective trees of the system, wherein the respective trees comprise metadata representing respective states of the system corresponding, via the snapshots, to the respective times; and
a garbage collection component that
selects a snapshot of the snapshots of the roots that is older than remaining snapshots of the snapshots of the roots,
determines, using an object table of the snapshot referencing data chunks comprising respective objects of the system, whether a data chunk of the data chunks comprises an inactive object of the respective objects to facilitate a selection of the data chunk as a garbage collection (GC) candidate for deletion via a GC procedure, and
based on a defined criterion, selects a GC front value from respective sequence numbers that monotonically increase and that have been assigned to repository data chunks of the data chunks, wherein the GC front value defines a scope of the GC procedure that delineates a group of the repository data chunks that is acceptable for deletion via the GC procedure, and wherein the GC front value is greater than sequence numbers of the respective sequence numbers corresponding to the group of the repository data chunks.

2. The system of claim 1, wherein the garbage collection component:
in response to the data chunk being determined to comprise the inactive object, selects the data chunk as the GC candidate.

3. The system of claim 1, wherein the garbage collection component:
assigns the respective sequence numbers to the repository data chunks upon creation of each of the repository data chunks.

4. The system of claim 1, wherein the garbage collection component:
in response the GC candidate being determined to correspond to a sequence number of the respective sequence numbers that is less than or equal to the GC front value, deletes, via the GC procedure, the data chunk.

5. The system of claim 1, wherein a tree of the respective trees comprises the object table of the snapshot that references the data chunks comprising the respective objects of the system.

6. The system of claim 5, wherein the tree is a first tree, and wherein a second tree of the respective trees comprises a chunk table representing respective physical locations of the data chunks in the system.

7. The system of claim 6, wherein a physical location of the respective physical locations corresponding to the data chunk comprises a node of a cluster, a storage device of the node, and a physical location within the storage device comprising a sector of the storage device and an offset from a defined logical position of the sector within the storage device.

8. The system of claim 7, wherein the chunk table comprises the GC front value.

9. The system of claim 1, wherein the snapshot component generates the snapshots based on a defined snapshot period.

10. The system of claim 1, wherein the respective sequence numbers have been assigned to the repository data chunks upon creation of each of the repository data chunks.

11. A method, comprising:
generating, by a system comprising a processor, system snapshots of roots of respective search trees of the system, wherein the system snapshots represent, via metadata of the search trees, respective states of the system over time;
determining, by the system, whether a data chunk corresponding to a system snapshot of the system snapshots that is older than remaining system snapshots of the system snapshots comprises an active object to facilitate preservation of the active object during a garbage collection (GC) process until the active object has been referenced by at least one system snapshot of the system snapshots; and in response to the data chunk being determined, using an object data structure from the system snapshot, not to comprise the active object, determining, by the system, whether a sequence number that was assigned to the data chunk is less than or equal to a GC front value corresponding to the system snapshot, wherein the GC front value delineates repository data chunks that have been approved for deletion via the GC process based on respective monotonically increasing sequence numbers, comprising the sequence number, that have been assigned to the repository data chunks.

12. The method of claim 11, further comprising:
in response to the sequence number that was assigned to the data chunk being determined to be less than or equal to the GC front value, deleting, by the system during the GC process, the data chunk, wherein the repository data chunks comprise the data chunk.

13. The method of claim 12, wherein the deleting comprises:
deleting GC ready data chunks comprising the data chunk based on a defined period, wherein the GC ready data chunks are associated with a group of sequence numbers of the respective monotonically increasing sequence numbers that have been determined to be less than or equal to the GC front value.

14. The method of claim 11, wherein the determining comprises:
in response to the data chunk being determined, using an object data structure from the system snapshot, to comprise the active object, excluding, by the system, the data chunk from being deleted during the GC process, wherein the object data structure describes data chunks comprising respective objects of the system, wherein the data chunks comprise the data chunk, and wherein the respective objects comprise the object.

15. The method of claim 11, further comprising:
assigning, by the system, the sequence numbers to the repository data chunks upon creation of the repository data chunks.

16. A machine-readable storage medium comprising instructions that, in response to execution, cause a storage system comprising a processor to perform operations, comprising:

generating snapshots of roots of respective metadata based trees of the storage system representing respective states of the storage system;

in response to selecting an oldest snapshot of the snapshots that is older than remaining snapshots of the snapshots, determining, using an object data structure from the oldest system snapshot, whether a data chunk of the storage system comprises an inactive object of the storage system to facilitate deletion of the data chunk during a garbage collection (GC) process of the storage system, wherein the object data structure describes data chunks comprising respective objects of the storage system, wherein the data chunks comprise the data chunk, and wherein the respective objects comprise the inactive object; and in response to a data sequence number that has been assigned to the data chunk being determined to be less than or equal to a GC front value representing a scope of the GC process with respect to a group of data chunks that have been stored in a data repository of the storage system, deleting, via the GC process, the data chunk, wherein the scope is based on data sequence numbers, comprising the data sequence number, that have been assigned to the group of data chunks, and wherein the group of data chunks comprises the data chunk.

17. The machine-readable storage medium of claim 16, wherein the determining comprises:
in response to the data chunk being determined to comprise an active object, excluding the data chunk from being deleted during the GC process.

18. The machine-readable storage medium of claim 16, wherein the determining comprises:
in response to the data chunk being determined to comprise the inactive object, selecting the data chunk as a GC candidate to be deleted during the GC process.

19. The machine-readable storage medium of claim 18, wherein the operations further comprise:
in response to the data sequence number being determined to be greater than the GC front value, excluding the data chunk from being deleted via the GC process.

20. The machine-readable storage medium of claim 16, wherein the operations further comprise:
assigning the data sequence number to the data chunk upon creation of the data chunk.

* * * * *